United States Patent

Nakanishi et al.

[11] Patent Number: 5,852,752
[45] Date of Patent: Dec. 22, 1998

[54] CAMERA WITH POP-UP STROBE UNIT

[75] Inventors: Takao Nakanishi; Tetsuo Hosokawa, both of Tokyo, Japan

[73] Assignee: Asahi Kogaku Kogyo Kabushiki Kaisha, Tokyo, Japan

[21] Appl. No.: 826,822

[22] Filed: Apr. 8, 1997

[30] Foreign Application Priority Data

Apr. 9, 1996 [JP] Japan ..................................... 8-086611

[51] Int. Cl.⁶ .................................................. G03B 15/03
[52] U.S. Cl. ........................................... 396/176; 396/177
[58] Field of Search .................... 396/176, 177, 396/178

[56] References Cited

U.S. PATENT DOCUMENTS

| | | | |
|---|---|---|---|
| 4,945,368 | 7/1990 | Ishino et al. | 396/177 |
| 5,066,967 | 11/1991 | Yamamoto et al. | 396/177 |
| 5,270,757 | 12/1993 | Tosaka et al. | 396/177 |
| 5,329,327 | 7/1994 | Arai et al. | 396/177 |
| 5,565,941 | 10/1996 | Kaneko | 396/177 |
| 5,721,984 | 2/1998 | Kaneko et al. | 396/177 |

*Primary Examiner*—Eddie C. Lee
*Attorney, Agent, or Firm*—Greenblum & Bernstein, P.L.C.

[57] ABSTRACT

A camera provided with a pop-up strobe arranged such that the pop-up strobe is popped-up by pushing an operation button in a direction that is inclined with respect to a pivoting axis of the pop-up strobe. In particular, the operation button is mounted on a wall that is inclined with respect to the pivoting axis of the pop-up strobe and the direction in which the operation button is pushed is perpendicular to a surface of the inclined wall.

20 Claims, 5 Drawing Sheets

CAMERA WITH POP-UP STROBE UNIT

BACKGROUND OF THE INVENTION

The present invention relates to a camera having a pop-up internal strobe unit.

In a conventional camera having a pop-up strobe unit, the pop-up strobe unit includes a spring-loaded strobe head pivoted at the top of a camera body such that the strobe head can be popped up from the camera body by the spring force. Generally, the pop-up strobe unit is further provided with a spring for biasing the strobe head upward, a locking member that engages with the strobe head to hold the strobe head down (i.e. in a retracted position), and an operation button to actuate the locking member to release the strobe head. When the operation button is pressed, the strobe head pops up by the force of the spring.

Since the motion of the strobe head is essentially vertical, the locking member is generally designed to move in a lateral direction (for example, left to right with respect to the photographer when the camera is held in a standard position) to engage with the strobe head and lock the strobe head in a retracted position. Since the locking member moves laterally, the operation button for actuating the locking member also generally moves in a lateral direction. That is, the operation button is pressed in a lateral direction to release the locking member.

However, since the operation button is generally mounted on an inclined wall of a trapezoid decorative cover provided at the top of the camera body, the operation of the operation button is somewhat confusing and difficult since the direction in which the operation button is to be pushed is not perpendicular to the inclined wall of the decorative cover.

SUMMARY OF THE INVENTION

It is therefore an object of the present invention to provide an improved camera with a pop-up strobe unit that is easy to operate.

According to one aspect of the invention, there is provided a camera that includes a strobe head pivotable about a pivoting axis (between an operating position and a retracted position), a locking arrangement for locking the strobe head at the retracted position, and an operation button to be pressed in a predetermined direction for actuating the locking arrangement to release the strobe head. The predetermined direction is inclined with respect to pivoting axis.

As constructed above, in case a wall on which the operation button is mounted is not perpendicular to the pivoting axis, the pressing direction of the operation button may be substantially perpendicular to the wall. Accordingly, the operation button is easier to press than a conventional operation button in which the pressing direction is not perpendicular to the wall on which it is mounted.

In a particular arrangement, the strobe head may have a strobe head cover, which forms a part of a decorative cover of the camera when the strobe head is in the retracted position. In this case, the operation button can be provided to the strobe head cover. Further, it is preferred that the wall on which the operation button is mounted has a recess for mounting the operation button, so that the operation button does not protrude excessively from the wall.

In a preferred embodiment, the locking arrangement includes a swingable lever provided with an engaging portion which engages with the strobe head when the strobe head is in the retracted position and an abutting portion which is to be pushed by the operation button. In this case, when the operation button is pressed, the operation button pushes the abutting portion to swing the lever in a direction so that the engaging portion disengages from the strobe head. With this, the locking arrangement is constructed in a simple manner.

The lever is horizontally swingable and the pressing direction of the operation button is inclined with respect to the horizontal plane. Accordingly, the operation button is arranged to slide along the abutting portions, enabling the lever to slide horizontally.

According to another aspect of the invention, there is provided a camera that includes a camera body, a strobe head pivotable about a pivoting axis laterally provided at the top of the camera body, a swingable lever being swingable for locking the strobe head at the retracted position, and an operation button to be pressed in a predetermined direction for swinging the lever to release the strobe head. The predetermined direction is inclined with respect to a pivoting axis.

As constructed above, since the pressing direction of the operation button is perpendicular to the plane of the wall, the operation button is easier to press than a conventional operation button in which the pressing direction is not perpendicular to the wall on which it is mounted.

It is preferred to provide at least one pivot shaft which defines the pivoting axis at the top of the camera body. Further, the camera body can be provided with a hot shoe at the top thereof for mounting an external strobe and a pair of side walls provided on both sides of the hot shoe.

DETAILED DESCRIPTION OF THE PREFERRED EMBODIMENTS

Figure 1:
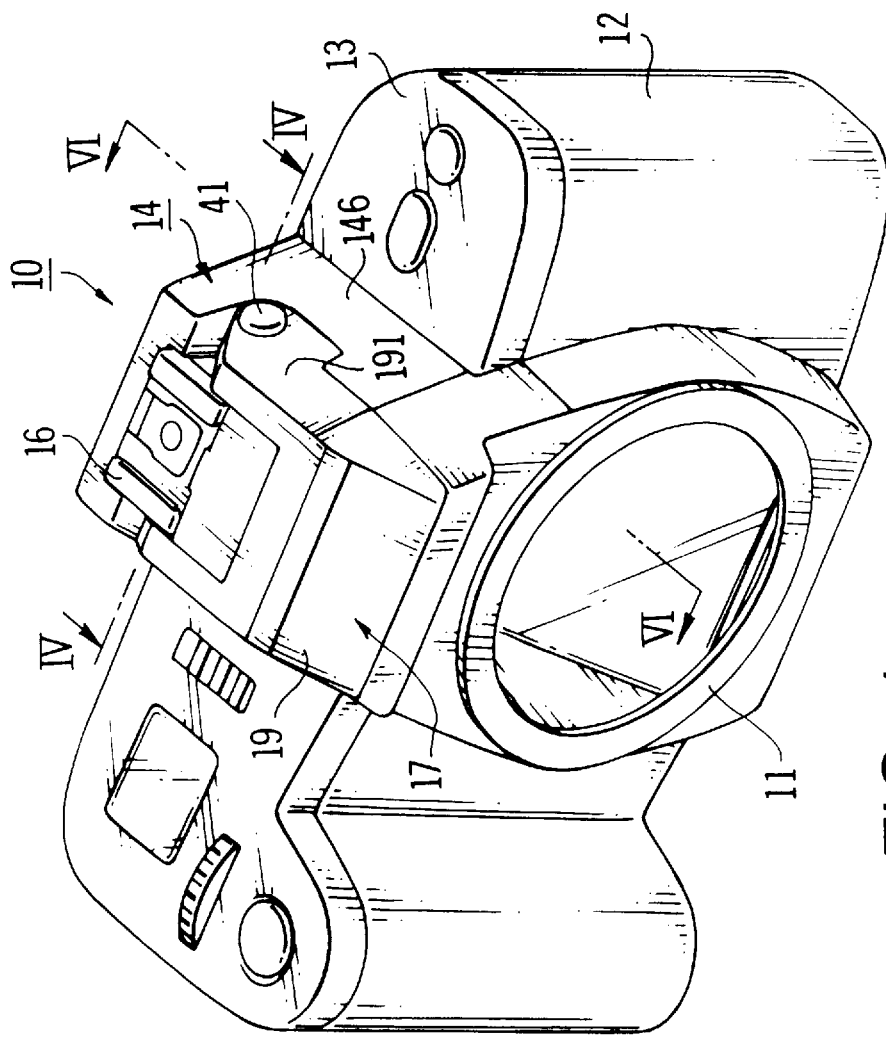
FIG. 1 is a perspective view of a camera with a pop-up strobe unit to which the present invention is applied.
Figure 2:
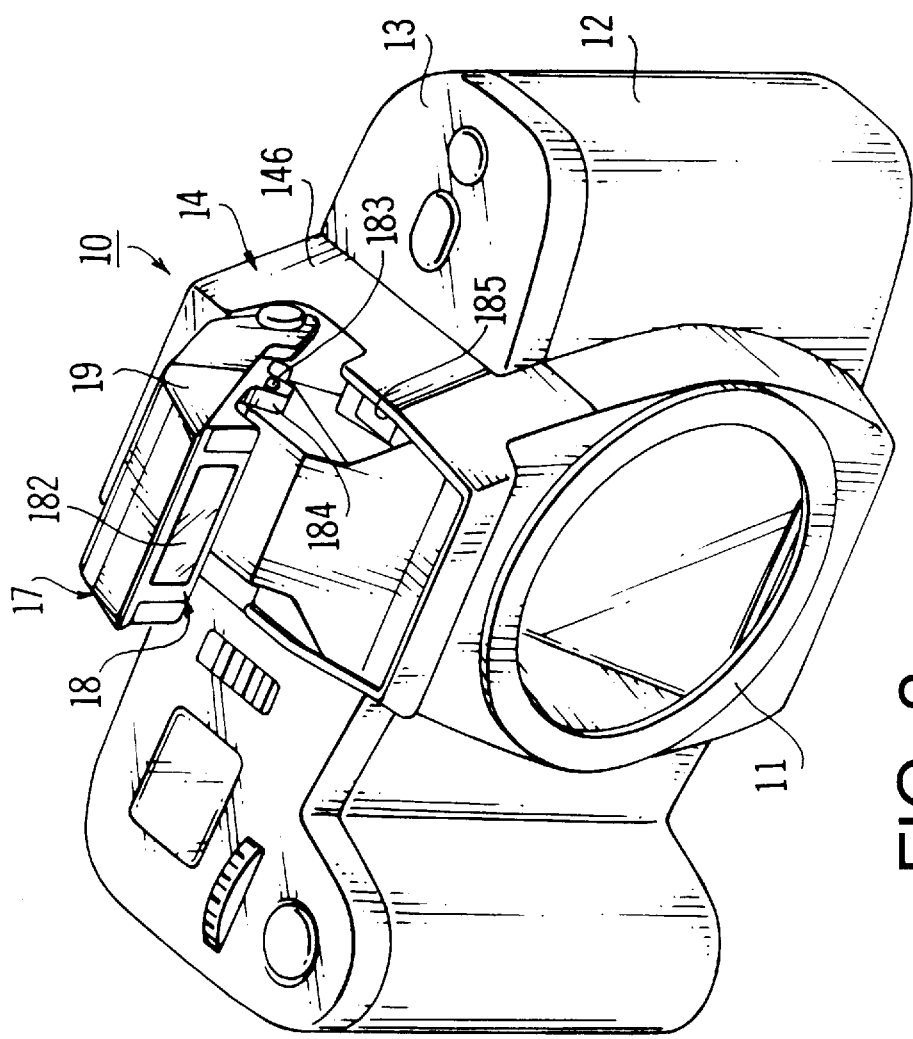
FIG. 2 is a perspective view of the camera of FIG. 1 with a strobe head popped up.

FIGS. 1 and 2 are perspective views showing a single reflex lens (SLR) camera 10 to which the present invention is applied. The camera 10 has a camera body 12 having a lens mount 11 at the front side thereof and a top cover 13 provided on the top of the camera body 12 (the top, front, and the like of the camera body are defined when the camera is held in a standard position). A center cover 14 is formed at the center of the top cover 13 protruding upward from the top cover 13 in a trapezoidal shape.

The center cover 14 is provided with a pivotably mounted pop-up strobe head 17. As shown in FIG. 2, the strobe head 17 includes a head body 18 provided with a light source window 182 on the front surface thereof and a head cover 19 which covers the head body 18. A light source (not shown) such as a xenon flash tube or the like, is provided behind the light source window 182.

Figure 3:
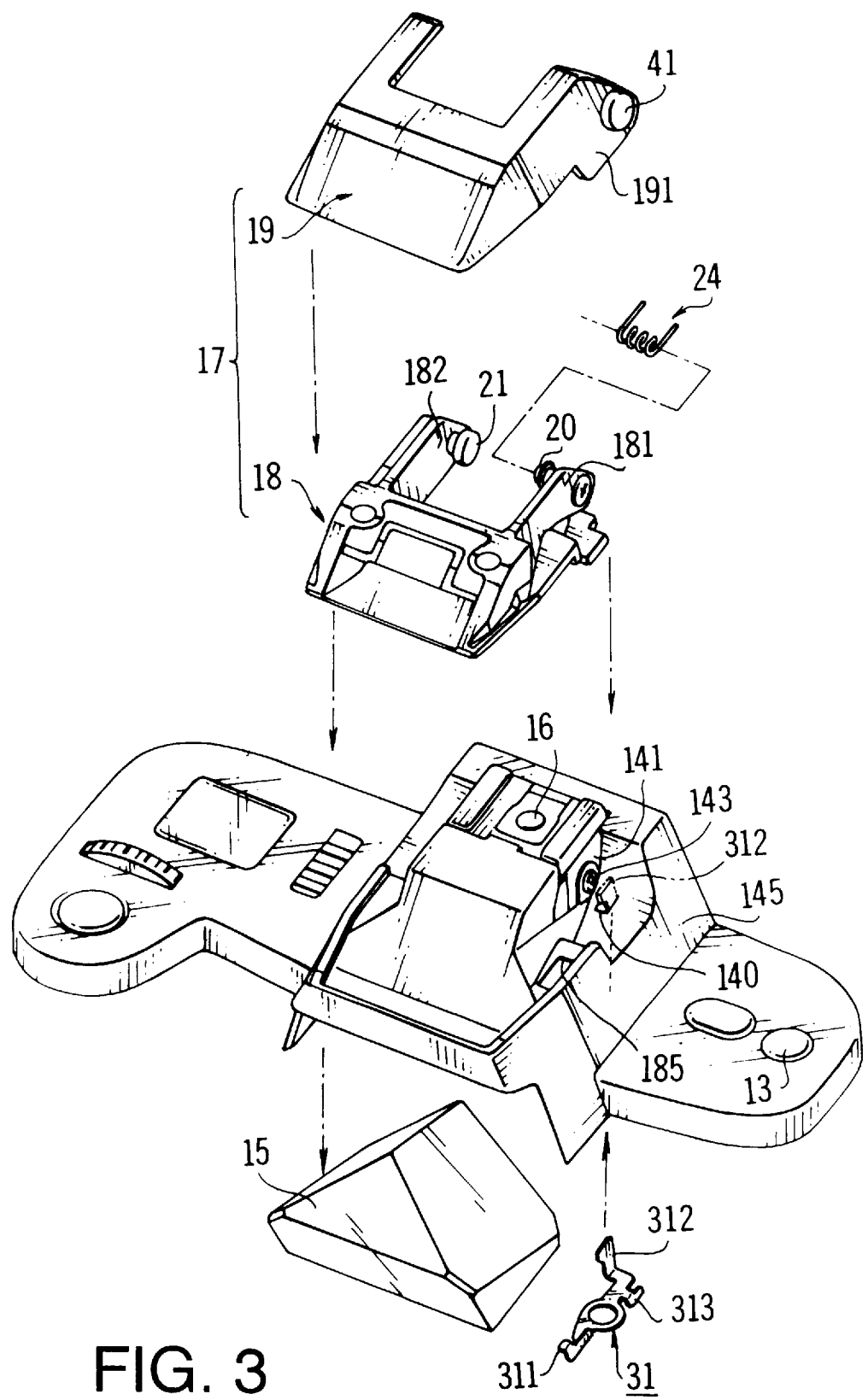
FIG. 3 is an exploded view of a top portion of the camera of FIG. 1.

FIG. 3 is an exploded perspective view of a top portion of the camera 10. The center cover 14 is formed to cover the top of a penta-prism 15 provided inside the camera body 12

(FIG. 1). Further, the center cover 14 is provided with a hot shoe 16 at the top thereof, for mounting an external strobe (not shown).

Figure 4:
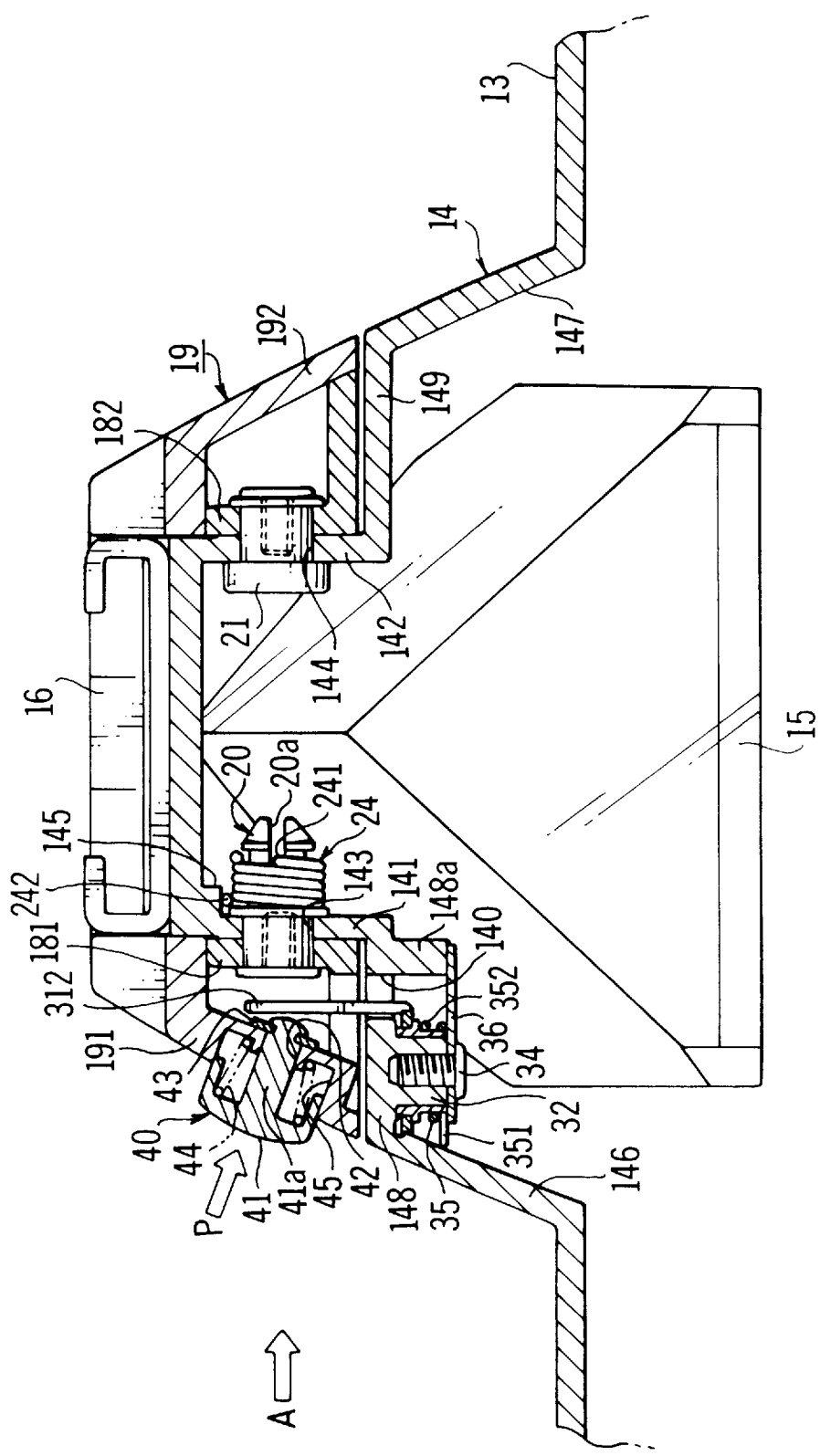
FIG. 4 is a sectional view of the camera of FIG. 1 taken along the line IV—IV in FIG. 1.

FIG. 4 is a back sectional view taken along the line IV—IV in FIG. 1. In the view of FIG. 4, the center cover 14 includes two vertical side walls 141 and 142 formed on both sides of the hot shoe 16 and two step portions 148 and 149 that are formed at right angles to the side walls 141 and 142. Further, two sloped walls 146 and 147 are formed respectively between the step portions 148 and 149 and the top cover 13. That is, the center cover 14 is formed having a shape that efficiently covers the penta-prism 15 while providing a support for the hot shoe 16.

As shown in FIG. 3, the head body 18 is provided with two shafts 20 and 21, laterally extending in line with each other. As shown in FIG. 4, the shafts 20 and 21 fit into two holes 143 and 144 provided to the side walls 141 and 142 respectively, in such a manner that the strobe head 17 is pivotablly mounted at the top of the camera 10.

The head cover 19 is trapezoid-shaped and has two inclined wall 191 and 192. When the strobe head 17 is in a retracted position (i.e., is not popped-up, as shown in FIG. 4), the head cover 19 contacts the step portions 148 and 149 and the inclined walls 191 and 192 of the head cover 19 are flush with the sloped walls 146 and 147 of the center cover 14, respectively. This arrangement forms a decorative cover protruding upward from the top cover 13.

As shown in FIG. 3, a torsion spring 24 is provided to the shaft 20 in order to bias the strobe head 17 to pop up. As shown in FIG. 4, the shaft 20 has a groove 20a at an end thereof and one end of the torsion spring 24 is engaged into the groove 20a while the other end of the spring 24 abuts a lower surface 145 of the center cover 14, so that, the shaft 20 is biased to rotate clockwise (seen from direction A). Since the shaft 20 is fixed to the strobe head 17, the strobe head 17 is biased to pop-up.

Figure 5:
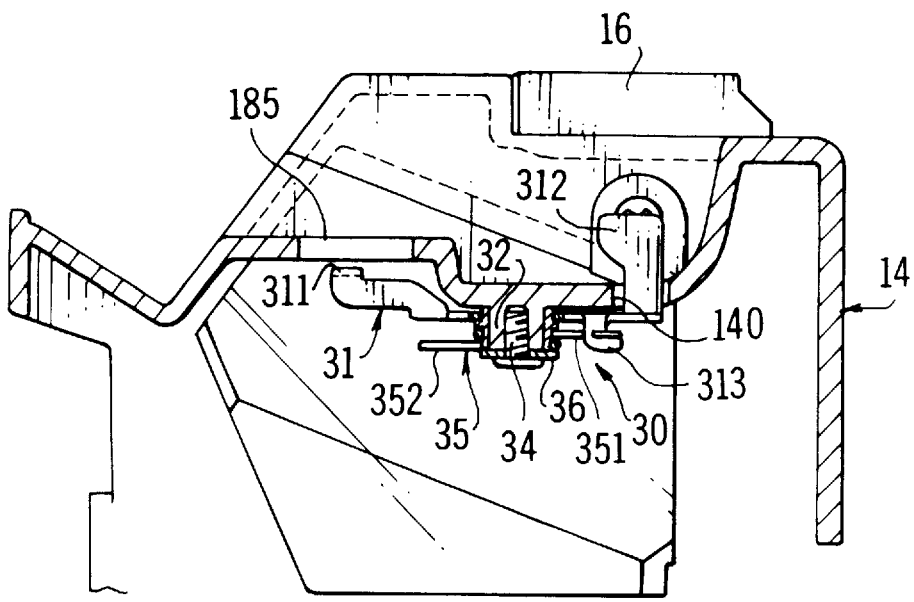
FIG. 5 is a sectional view of the camera of FIG. 1 taken along line VI—VI in FIG. 1.
Figure 6:
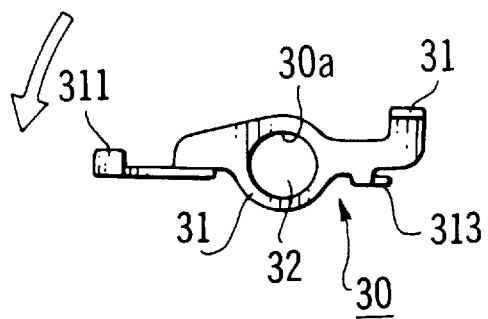
FIG. 6 is a plan view of a lever of locking arrangement.

FIG. 5 is a sectional view of the camera of FIG. 1 taken along line VI—VI in FIG. 1 (the strobe head 17 is not shown). As shown in FIG. 5, the locking arrangement includes a swingable lever 31 made of plate metal or the like. FIG. 6 is a plan view of the lever 31. The lever 31 is provided with a center hole 30a through which a shaft 32 formed on the center cover 14 is inserted. As shown in FIG. 5, the lever 31 is supported on the shaft 32 by a bottom plate 36 fixed to the bottom end of the shaft 32 by means of a screw 34, so that the lever 31, is horizontally swingable about the shaft 32.

An engaging portion 311 is formed at one end of the lever 31 to engage with an engaging hole 183 (FIG. 2) formed on a projecting wall 184 of the head body 18. An abutting portion 312 is formed at the other end of the lever 31. The abutting portion 312 protrudes upward through a hole 140 formed in the center case 14 to be pushed by an operation button 41 (described below).

As shown in FIGS. 4 and 6, a torsion spring 35 is provided to the shaft 32. One end 352 of the torsion spring 35 abuts a vertical wall 143 of the center cover 14 (as shown in FIG. 4) and the other end 351 of the torsion spring 35 engages a projection 313 provided to the lever 31 (as shown in FIG. 6), so that the lever 31 is biased to rotate counterclockwise in FIG. 5.

The projecting wall 184 projects downward from the head body 18. When the strobe head 17 is manually pressed downward to the retracted position, the projecting wall 184 enters into the camera body 12 through an opening 185 formed on the center cover 14, until the engaging portion 311 of the lever 31 fits into the engaging hole 183 due to the biasing of the lever 31. That is, the strobe head 17 is locked at the retracted position.

As shown in FIG. 4, the operation button 41 is provided to the inclined wall 191 of the head cover 19. The inclined wall 191 is provided with a recess 45 for slidably supporting the operation button 41. The operation button 41 has a center shaft 41a which is inserted into a bottom hole 42 formed on a bottom of the recess 45. The recess 45 is formed so that the sliding direction of the operation button 41 is perpendicular to the inclined wall 191.

A coil spring 44 is provided between the bottom of the recess 45 and the operation button 45, such that, when not being pressed, the operation button 45 is pushed by the coil spring 44 to its original position.

When the operation button 45 is pressed, the tip of the center shaft 41a pushes the abutting portion 312 of the lever 31, which swings the lever 31 and moves the engaging portion 311 out of engagement with the engaging hole 183, and the strobe head 17 pops up due to the force of the torsion spring 24. That is, by pressing the operation button 41, the strobe head 17 is popped up.

Since the lever 31 is horizontally swung and the pressing direction of the operation button 41 is inclined with respect to the horizontal plane, the tip of the center shaft 41a vertically slides along the abutting portion 312, which enables the lever 31 to swing.

According to the present embodiment, the operation button 17 is pressed in a direction that is perpendicular to the inclined wall 191 of the head cover 19. Accordingly, the operation button is easier to press than a conventional operation button in which the pressing direction is not perpendicular to the wall on which it is mounted.

Although the structure and operation of a camera with a pop-up strobe is described herein with respect to the preferred embodiment, many modifications and changes can be made without departing from the spirit and scope of the invention.

The present disclosure relates to subject matter contained in Japanese Patent Application No. HEI 8-86611, filed on Apr. 9, 1996, which is expressly incorporated herein by reference in its entirety.

What is claimed is:

1. A camera, comprising:

a strobe head pivotable about a pivoting axis, said strobe head being pivotable between an operating position and a retracted position about the pivoting axis;

a locking arrangement that locks said strobe head at said retracted position;

a trapezoid-shaped strobe head cover provided to said strobe head, said trapezoid-shaped strobe head cover including a wall which is inclined with respect to a plane which is perpendicular to the pivoting axis of said strobe head; and an operation button that is provided in said wall, said operation button being pressed in a direction perpendicular to said wall to actuate said locking arrangement to release said strobe head.

2. The camera according to claim 1, wherein said strobe head cover forms a part of a decorative cover of said camera when said strobe head is in said retracted position.

3. The camera according to claim 1, said wall having a recess in which said operation button is slidably mounted.

4. The camera according to claim 1, wherein said locking arrangement comprises a swingable lever provided with an engaging portion which engages with said strobe head when said strobe head is in said retracted position and an abutting portion which is to be pushed by said operation button.

5. The camera according to claim 4, wherein said operation button pushes said abutting portion to swing said lever in a predetermined direction so that said engaging portion disengages from said strobe head when said operation button is pressed.

6. The camera according to claim 5, wherein said lever is biased in a reversed direction with respect to said predetermined direction.

7. The camera according to claim 6, wherein said lever is horizontally swingable, said predetermined direction of said operation button is inclined with respect to said horizontal plane.

8. The camera according to claim 7, wherein said operation button slides along said abutting portion, enabling said lever to swing horizontally.

9. The camera of claim 1, further comprising a vertical wall positioned perpendicular to the pivoting axis, said wall inclined with respect to said vertical wall.

10. A camera, comprising:

a camera body;

a strobe head pivotable about a pivoting axis provided at a top of said camera body, said strobe head being pivotable between an operating position and a retracted position;

a swingable lever which locks said strobe head at said retracted position, said lever being horizontally swingable;

a trapezoid-shaped strobe head cover provided to said strobe head, including a wall which is inclined with respect to a plane perpendicular to the pivoting axis of said strobe head; and an operation button mounted to said wall, a central axis of said operation button extending perpendicular to said wall, said operation button being pressed in a predetermined direction for swinging said lever to release said strobe head.

11. The camera according to claim 10, wherein said wall is inclined with respect to said pivoting axis and is perpendicular to said predetermined direction.

12. The camera according to claim 11, wherein a recess is formed on said wall, in which said operation button is slidably supported.

13. The camera according to claim 12, wherein said operation button slides along said abutting portion, enabling said lever to swing horizontally.

14. The camera according to claim 10, further comprising at least one pivot shaft provided at said top of said camera body, said pivot shaft defining said pivoting axis.

15. The camera according to claim 14, wherein said top of said camera body is provided with a hot shoe for mounting an external strobe.

16. The camera according to claim 15, wherein said camera body is further provided with a pair of side walls formed on both sides of said hot shoe, said pivot shaft being provided to said side walls.

17. The camera according to claim 16, wherein said hot shoe and said side walls are formed on a top of said trapezoid-shaped cover.

18. The camera according to claim 17, wherein said trapezoid-shaped cover covers a top of the penna-prism provided in said camera body.

19. The camera according to claim 17, wherein said strobe head cover forms a decorative cover of said camera.

20. The camera of claim 10, further comprising a vertical wall positioned perpendicular to the pivoting axis, said wall inclined with respect to said vertical wall.

* * * * *